Sept. 15, 1964　　　　　H. A. GORJANC　　　　　3,148,631
MATERIAL HANDLING SYSTEM
Filed Dec. 11, 1959　　　　　　　　　　　　　5 Sheets-Sheet 1

INVENTOR.
HENRY A. GORJANC
BY Hudson, Boughton,
Williams, David & Hoffmann
ATTORNEYS.

United States Patent Office 3,148,631
Patented Sept. 15, 1964

3,148,631
MATERIAL HANDLING SYSTEM
Henry A. Gorjanc, Wickliffe, Ohio, assignor to The Cleveland Crane & Engineering Company, Wickliffe, Ohio, a corporation of Ohio
Filed Dec. 11, 1959, Ser. No. 859,006
15 Claims. (Cl. 104—88)

The present invention relates to a material handling system wherein a self-propelled carrier has control means thereon presettable to select the destination of the carrier and effective to direct the carrier through the system to the preselected destination.

One of the principal objects of the present invention is the provision of a new and improved material handling system including a carrier, a track system along which the carrier operates and which includes a plurality of control points at which a control function effecting the movement of the carrier may be effected, the carrier moving through the control points in sequence until the control operation is performed, and a control system for the carrier including a counter on the carrier for counting the control points through which the carrier passes and presettable to effect the control operation at one of said points after receiving a predetermined number of counts indicating that the carrier has passed through a corresponding number of control points, the control system being so constructed and arranged that the number of the aforesaid control points in the system at which the counter is to selectively effect a control operation is greater than the counting capacity of the counter.

Another object of the present invention is the provision of a new and improved material handling system having a carrier, a track system for the carrier including a home station and a plurality of control stations through which the carrier moves when dispatched from the home station and at a selected one of which a control operation effecting the movement of the carrier is to be performed, and a control system for said carrier which includes a counter on the carrier for counting the control stations through which the carrier passes and presettable to effect the control operation after the carrier passes a pre-selected number of stations, the system being so constructed and arranged that the counting action of the counter can be selectively delayed until after the carrier has passed a predetermined number of control stations upon leaving the home station.

A further object of the present invention is the provision of a new and improved material handling system including a carrier, a track over which the carrier operates, a plurality of control stations along the track through which the carrier is adapted to pass and at which a control operation affecting the movement of the carrier is to be selectively performed and a control system for the carrier which includes presettable counting means for counting the control stations through which the carrier passes and for effecting the aforesaid control operation after the carrier has passed a preset number of stations, the system being so constructed and arranged that the counter may be set, when it is at a particular station, by manipulating controls permanently mounted at the station.

The invention further resides in certain novel features of construction, combinations and arrangements of parts and circuits, and further objects and advantages of the invention will be apparent to those skilled in the art to which it pertains from the following description of the present preferred embodiment thereof, made with reference to the accompanying drawings forming a part of this specification, and wherein the same reference characters represent corresponding parts throughout the several views, and in which:

FIG. 7 is a pictorial view of a stepping relay having a stepping and a reset coil.

The present invention is susceptible of various modifications and constructions and it is susceptible of being embodied in various types of material handling systems. For purposes of illustration and explanation, the present invention has been embodied in a tire-handling system for dispatching tires from a loading station L to a plurality of mold stations S where the carrier is to be stopped and a mold operation performed on the partially processed tires carried by the carrier. The carriers are to be returned from the mold stations to the loading station L after the tires have been removed therefrom.

Figure 1:
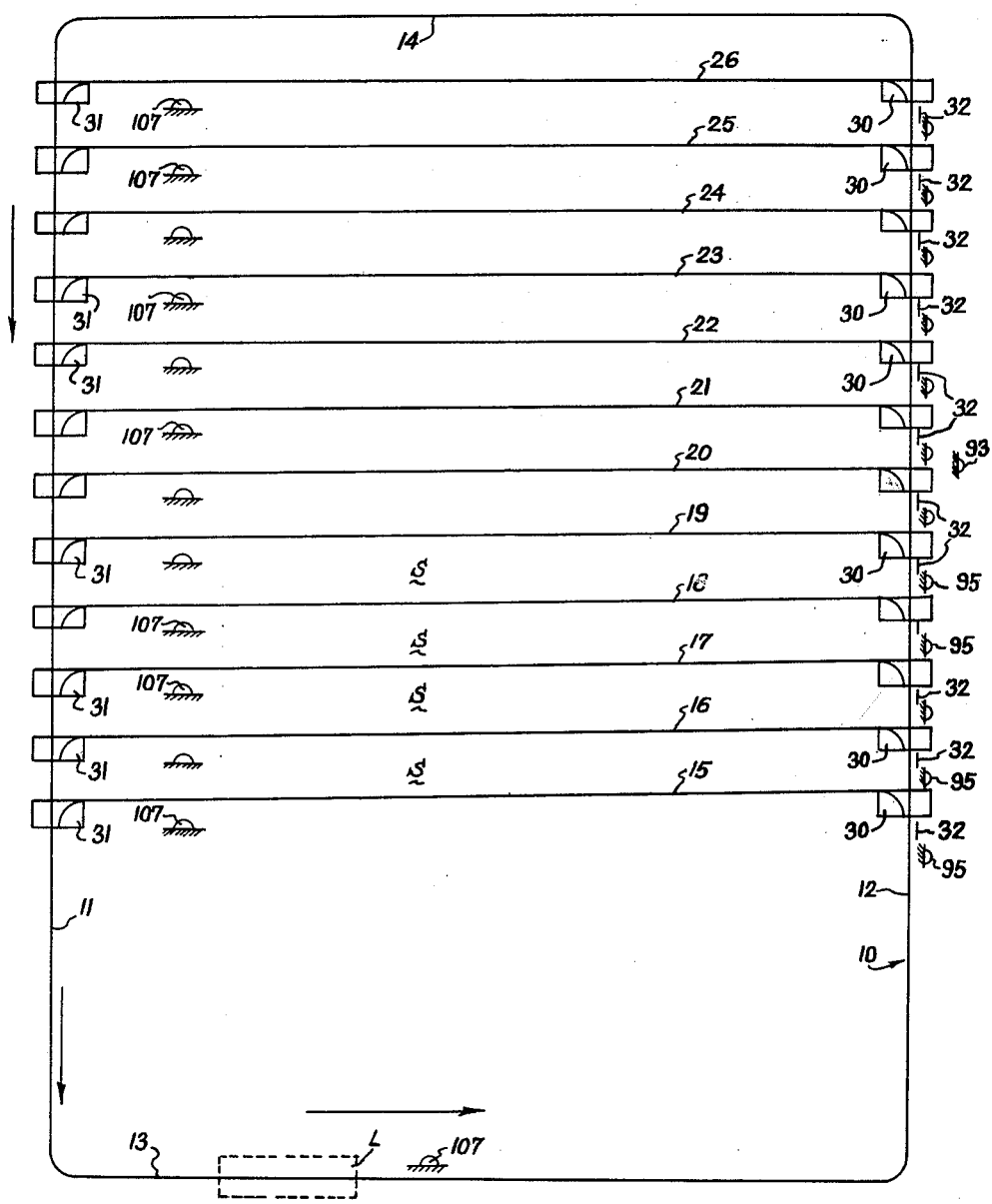
FIG. 1 is a diagrammatic showing of a conveyor system having a main line or track, branch tracks and a stopping point or station on each branch track.
Figure 5:
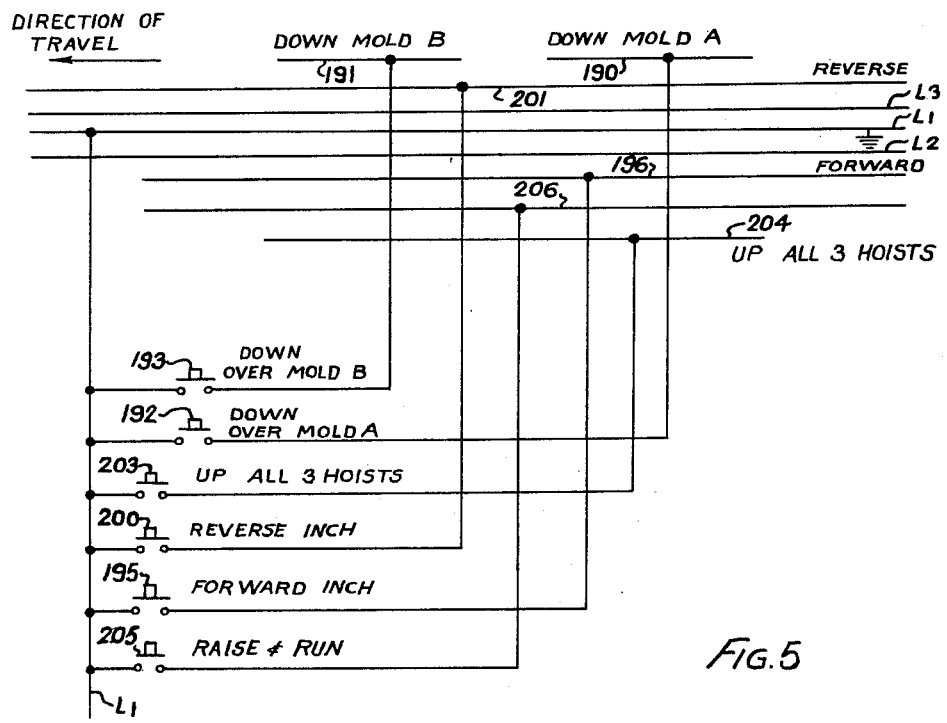
FIG. 5 is an electrical diagram of a control circuit for the unloading stations of the system.
Figure 2:
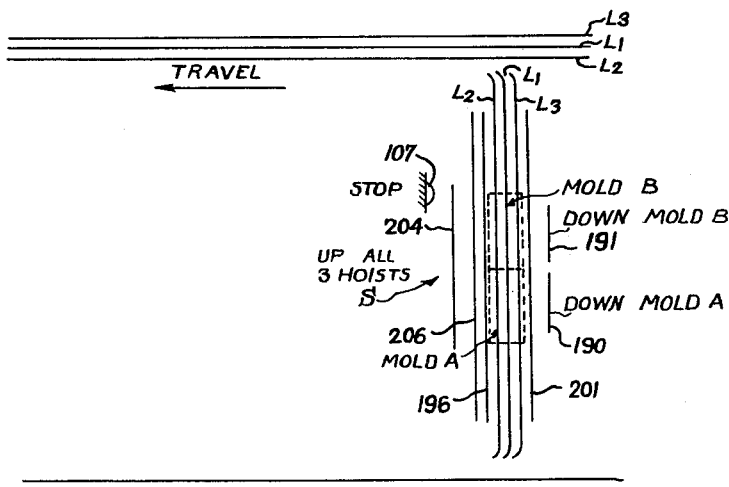
FIG. 2 shows a schematic electrical diagram showing the power system for a portion of the system of FIG. 1.
Figure 3:
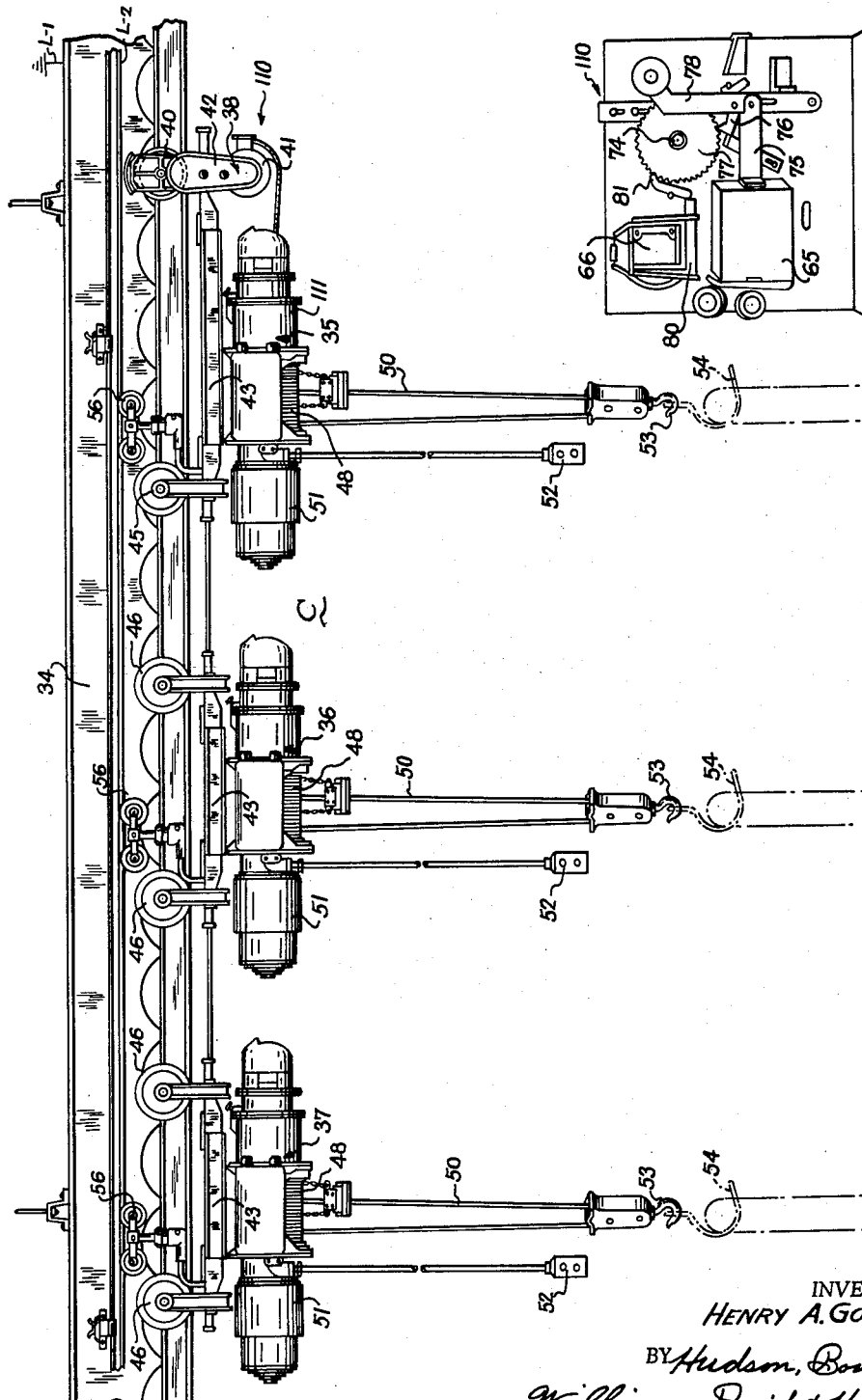
FIG. 3 is a view of a portion of the system of FIG. 1. showing a track and a carrier train for operating over the tracks.

The material handling system is, in the illustrated embodiment, an overhead monorail system and has a track layout, shown in FIG. 1, over which a carrier C (FIG. 3) is adapted to operate. The track layout includes a main track or line 10 defining a generally rectangular path for the carrier C and providing parallel lines or track portions 11, 12 along the opposite sides of the rectangular path, and parallel lines or track portions 13, 14 at the opposite ends of the rectangular path and joining the side track portions 11, 12. The end track portion 13 includes the loading station L where the carrier C is loaded and from which it moves to the track portion 12. The carrier C can proceed along the line or track portion 12 across the end track 14 and then along the line 11, which may be termed the "return line," to the line 13 and loading station L.

A plurality of parallel branch lines or tracks 15–26 connect the line 12 and the return line 11, and each branch line has one of the mold stations S therealong at which the carrier is to stop if it enters the branch line. An entering track switch 30 and an exit track switch 31 connects each branch line to the track portions 12, 11, respectively, of the main line and a carrier C proceeding along the line 12 can enter a branch line through the corresponding entrance switch 30 and enter the return line 11 by means of the corresponding exit switch 31.

The entering and exit track switches may be of any suitable construction and it is not deemed necessary for purposes of the present invention to describe the structure or operation of the track switches. Suffice it to say that each track switch of the switches 30 has a control system therefor which includes a switch actuator or conductor segment 32 supported along the track approaching the switch and which is engaged by a trolley 33 on the carrier C, the trolley 33 being shown schematically in FIG. 6. As the carrier approaches the switch, the switch is thrown when the trolley engages the actuator 32 if a circuit to the trolley is made. In the case of the entrance switches 30, the switches are thown to switch the carrier into the corresponding branch line. When the trolley 33 passes beyond the actuator 32 the switch returns to its normal position, in which the switch permits carriers to move along main line 10.

In the illustrated embodiment, the overhead carrier C operates on a inverted T-shaped rail 34 which constitutes the track of the track layout shown in FIG. 1. The carrier C, as shown, comprises a train of three hoists 35, 36, 37 which are adapted to be drawn by an electrically powered self-propelled tractor 38, the tractor forming a part of hoist 35, with the hoists 36, 37 being trailer-type hoists connected in tandem with the unit forming the tractor 38 and the hoist 35. The tractor 38, together with the hoist 35 and the hoists 36, 37, are conventional and will not be described in detail. The tractor 38 comprises a pair of drive wheels 40, one of which is shown, which ride on the flanges of the rail 34 and which are driven by a reversible motor 41 through a speed reduction gear train within a housing 42. Each of the hoists includes a load bar 43 and one end of the load bar 43 of the hoist 35 is supported by the drive wheels 40 of the tractor 38 and the other end of the load bar is supported by a pair of wheels 45, only one of which is shown. The load bar 43 of each of the trailer-type hoists is supported by two pairs of wheels 46, only one of each pair being shown in FIG. 3, which ride on the flange of the T-shaped rail 34. The hoists 35, 36, 37 further each comprise a rotatable drum 48 having a cable 50 wound thereon with each drum being driven by an associated reversible electric motor 51. Each electric motor 51 can be controlled from a pendant control station 52 associated with the particular hoist and also by operating controls on a control panel at each unloading station. Each hoist cable 50 supports a load-carrying cargo hook 53 provided with a special hook 54 adapted to support a tire carcass thereon.

Figure 6:
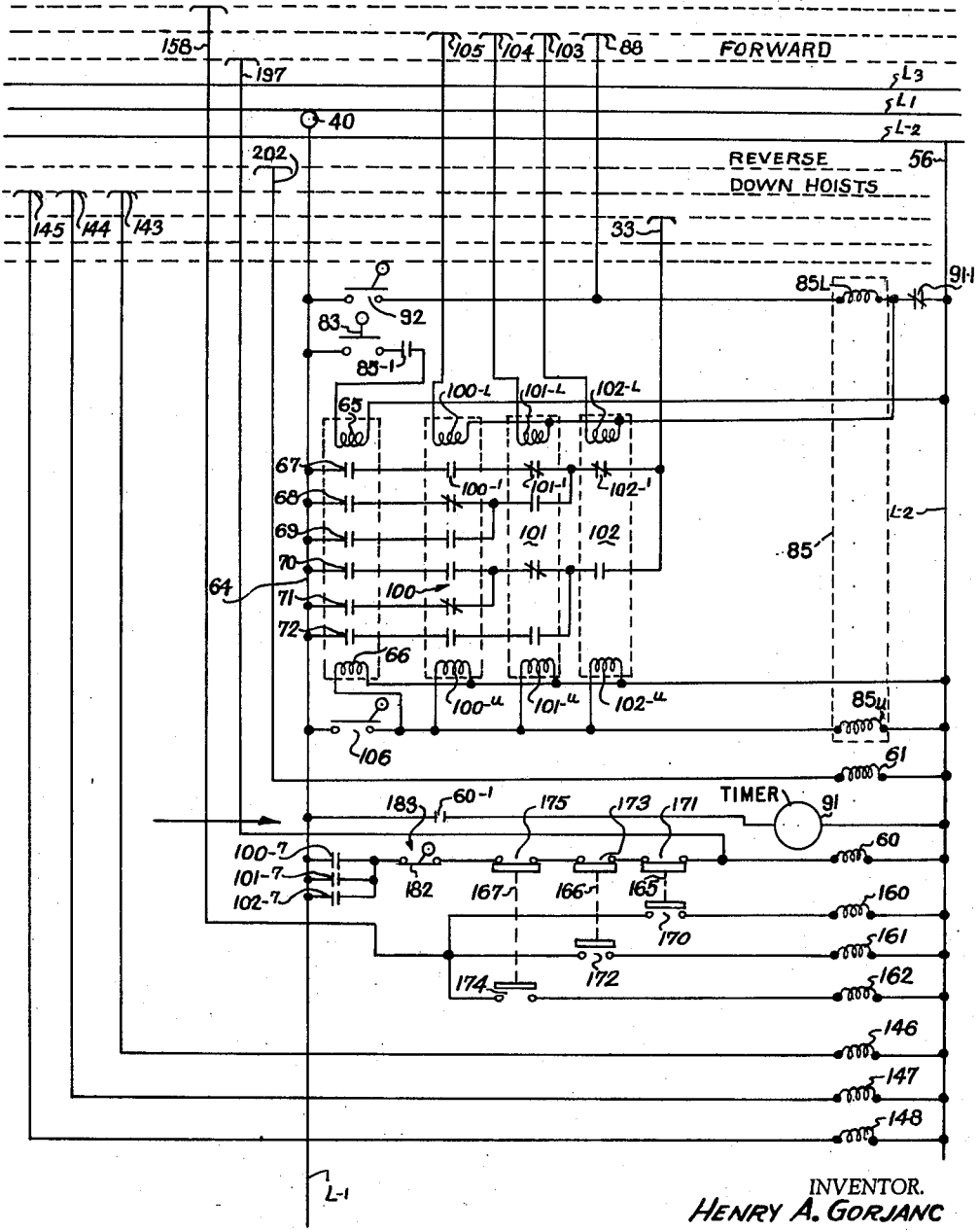
FIG. 6 is an electrical diagram of the portion of the carrier control circuit mounted on the carrier.

The tractor 38 and the control system for guiding the tractor through the system receives its power from two power bars which extend along the rail 34 throughout the track system. The two power bars are designated schematically in the electrical circuit diagrams as L2 and L3. The power bars L2 and L3 constitute two of the conductors of a three-phase system, with the third conductor, L1, being a ground conductor provided by the track 34 to which electrical contact is made through the wheels of the carrier. For obtaining power from the power bars L2 and L3, the carrier C mounts trolleys or collectors which ride on the power bars L2, L3, respectively. The collector 56 for L2 is shown schematically in FIG. 6 and structurally in FIG. 3, while the collector engaging the power bar L3 does not appear in the drawing but is understood to be similar to the conductor L2 but on the opposite side of the rail 34. In FIG. 6, the reference character 40 which designates the driving wheels of the tractor 38 has been applied to a schematic showing of the wheels to indicate that electrical connection for the control system may be made through the wheels 40 to the L1 conductor of the power supply.

The circuit diagram for the motor 41 for driving the tractor has not been shown in full but it is to be understood that the operation of the motor is controlled by two relays 60, 61 indicated schematically in FIG. 6 of the circuit diagram. When the relay 60 is energized, the motor operates to drive the tractor 38 in a forward direction and when the relay is energized, the motor operates to drive the tractor in a reverse direction. The relays 60, 61 are selectively energizable as hereinafter described.

The portion of the control system for the carrier which is mounted on the carrier is shown schematically in FIG. 6. This part of the control system for the carrier includes a counter comprising a stepping relay 64 including a relay coil 65 which is pulsed to step the relay, and a reset coil 66 which is energizable to reset the relay to an initial position. The relay has, in the illustrated ebodiment, contacts 67, 68, 69, 70, 71, 72 which are closed in sequence when the relay coil 65 is successively energized to step the relay from its initial position. The contacts 67 ... 72 are adapted to be successively closed by means of a rotatable contact arm, not shown, which has a rest position in which contacts 67–72 are open and which is fixed to a driven shaft 74 (FIG. 7). Shaft 74 is rotated an angular increment by pulsing the relay coil 65, FIGS. 6 and 7, to cause its armature 75 to move outwardly to the right, as viewed in FIG. 7, to move a dog 76 down and out of a notch in a ratchet wheel 77. The wheel 77 is rigidly connected to the shaft 74 and the dog 76 is interconnected with the armature by means of a pivotally connected lever 78. Each time the relay coil 65 of the stepping relay 64 is pulsed, the contact arm is stepped so as to close a different set of the contacts 67 . . . 72. Referring to FIG. 7, upon the pulsing of the rest coil 66, a control armature 80 is actuated downwardly to move a pivoted locking pawl 81 out of engagement with the ratchet wheel 77 and thereby permitting a torsion spring, not shown, to return the ratchet wheel back to its zero position or reset position. Inasmuch as stepping relays are conventional relays, a further description of the stepping relay is not deemed necessary.

Referring to FIG. 6, the stepping relay coil 65 is momentarily energized to step the contact arm of the relay by momentary closing of a carrier mounted limit switch 83 to connect the relay coil 65 to L1 to energize the latter, one side of the relay coil being directly connected to L2. It will be noted, however, that the circuit for energizing the relay coil 65 includes the normally open contacts 85–1 of a mechanically held relay which is latched in by energizing a relay coil 85L and which is unlatched by energizing a relay coil 85U. Hereinafter in the description of the circuit diagram, the latch coil of a relay will be designated by a reference numeral with an L immediately thereafter, the unlatched coil with the same reference numeral with a U immediately thereafter, and the contacts operated by the relay coils will be identified with the same reference numeral and a contact number separated from the reference numeral by a dash.

The energization of the relay coil 85L to latch in the contacts 85–1 may be selectively effected at the home station L by applying L1 potential to an outrig collector 88 mounted on the trolley in a conventional manner. The collector 88 is connected to the L1 side of the latching relay coil 85L, the other side of the latching relay coil 85L being connected directly to L2 through a set of normally closed contacts 91–1 of a timer 91. The relay coil 85L may also be connected to L1 on the carrier itself by the closing of a limit switch 92. The limit switch 92 is positioned on the carrier so as to be tripped by a limit switch tripper 93 mounted between branch tracks 20 and 21 along the line 12 so that the limit switch is stripped each time the carrier passes this point. If the relay coil 85L has previously been energized to latch in the relay by the operator at the home station, the tripping of the limit switch 92 will have no effect. On the other hand, if the relay coil 85L is not in its energized position, the tripping of the limit switch 92 will effect a latching in of the relay and the closing of the contacts 85–1, conditioning the count coil 65 to be energized by the closing of the limit switch 83.

The limit switch 83 is closed by a limit switch tripper 95 as the carrier approaches each of the track switches 30. The limit switch trippers 95 are mounted adjacent the rail 34 and the limit switch 83 is disposed on the carrier in position to be tripped when the carrier passes any of the trippers 95. Each time, therefore, that the carrier approaches the control switch with the contacts 85–1 closed, the count coil 65 is pulsed to add a count of 1 in the stepping relay and to close a different set of its contacts 67 . . . 72.

The contacts 67 . . . 72 are connected in parallel between L1 on the carrier and the collector 33 which is adapted to engage the conductive segment adjacent each of the track switches to effect a throwing of the track switch in the event that the collector 33 is connected to L1. Each of contacts 67 . . . 72 is connected in series with the contacts of a plurality of latching-type relays 100, 101, 102 having latch coils 100L, 101L, 102L and unlatch coils 100U, 101U and 102U, respectively. The circuit between the collector 33 and L1 for each of the contacts 67 . . . 72 includes a different unique combination of normally open and normally closed contacts of the relays comprising the latch coils 100L . . . 102L and each contact completes a circuit when closed only if a unique combination of the relay coils 100L . . . 102L is energized. In the case of the contact 67, the circuit in series therewith includes normally open contacts 100-1 closed by energizing latch coil 100L and normally closed contacts 101-1 and 102-1 which are opened when the relay coils 101L and 102L, respectively, are energized. In order for the closing of the contacts 67 to complete a circuit from L1 to the collector 33, relay coil 100L must have been energized to close contacts 100-1. This completes a circuit from L-1 through closed contacts 67, closed contacts 100-1, and normally closed contacts 101-1 and 102-1 to the collector 33. Similarly, the contact 68 is connected through contacts of the latching relays so that if the latching relay coils 100L, 102L are not energized while the latching relay coil 101L is energized a circuit is completed when the contacts 68 are closed. This circuit extends from L1 through closed contacts 68 and the now closed contacts through relays 100, 101, 102 that are in series with the closed contacts 68. When the contacts 69 are closed, the latching relay coils 100L, 101L must be energized and the latching relay coil 102L not energized to complete a circuit to the collector 33. When the contacts 70 are closed, the latching relays 100 and 102 must be latched or energized and the relay 101 unlatched or not energized to complete a circuit to the collector 33. When the contacts 71 are closed, the latching relays 100, 101 must be unlatched and the relay 102 latched to complete a circuit to the collector 33, and when the contacts 72 are closed, all the relays 100 . . . 102 must be latched in to complete a circuit to the collector 33. It can be seen that the number of times that the relay coil 65 must be pulsed before a circuit is completed to the collector 33 can be preselected by selectively energizing combinations of the latching coils 100L, 101L, 102L before the carrier is dispatched. The relay coils 100L, 101L, 102L can be selectively energized at the loading station by applying a potential to a respective one of three outrig trolleys or collectors 103, 104, 105, mounted on the carrier in a conventional manner, each of which is connected to the L1 side of a corresponding one of the relay coils 100L, 101L, 102L.

All of the latching relays are returned to their unlatched position by closing a limit switch 106 which connects L1 to the L1 side of the unlatch relay coils 85U, 100U, 101U, 102U and reset coil 66 of stepping relay 64. The limit switch 106 is closed by limit switch trippers 107 mounted adjacent the path of the carrier as it arrives at each stop station S. From the foregoing, it can be seen that the stepping relay may be set to perform a control operation after it passes a predetermined number of signal points where the limit switch 83 is closed by trippers 95 to pulse the relay coil 65. Furthermore, the pulsing of the relay coil 65 in response to the closing of limit switch 83 can be delayed until after the carrier has passed the signal points at the entrance switches for the first six branch tracks. Therefore, the carrier can be utilized in a system which has a greater number of control points where a control operation is to be selectively effected than the counting capacity of the counter, or stepping capacity of the stepping relay. In the illustrated embodiment, the stepping relay on the carrier has a stepping capacity of six and the system is so arranged that any one of the twelve branch tracks can be selected by selectively delaying the stepping action of the relay until after it passes the first six branch tracks. As mentioned hereinbefore, if the branch track being selected is within the first six branch tracks, the relay coil 85L is energized to latch in the contacts 85-1 before the carrier leaves the loading station L. If the branch track to be selected is after the sixth branch track, the operator at the loading station does not latch in the contacts 85-1 of relay 85 but leaves the relay 85 in an unlatched position and allows the tripping of the limit switch 92 by the limit switch tripper 93 to effect the energization of latching coil 85L and the latching in of the relay contacts 85-1.

Figure 4:
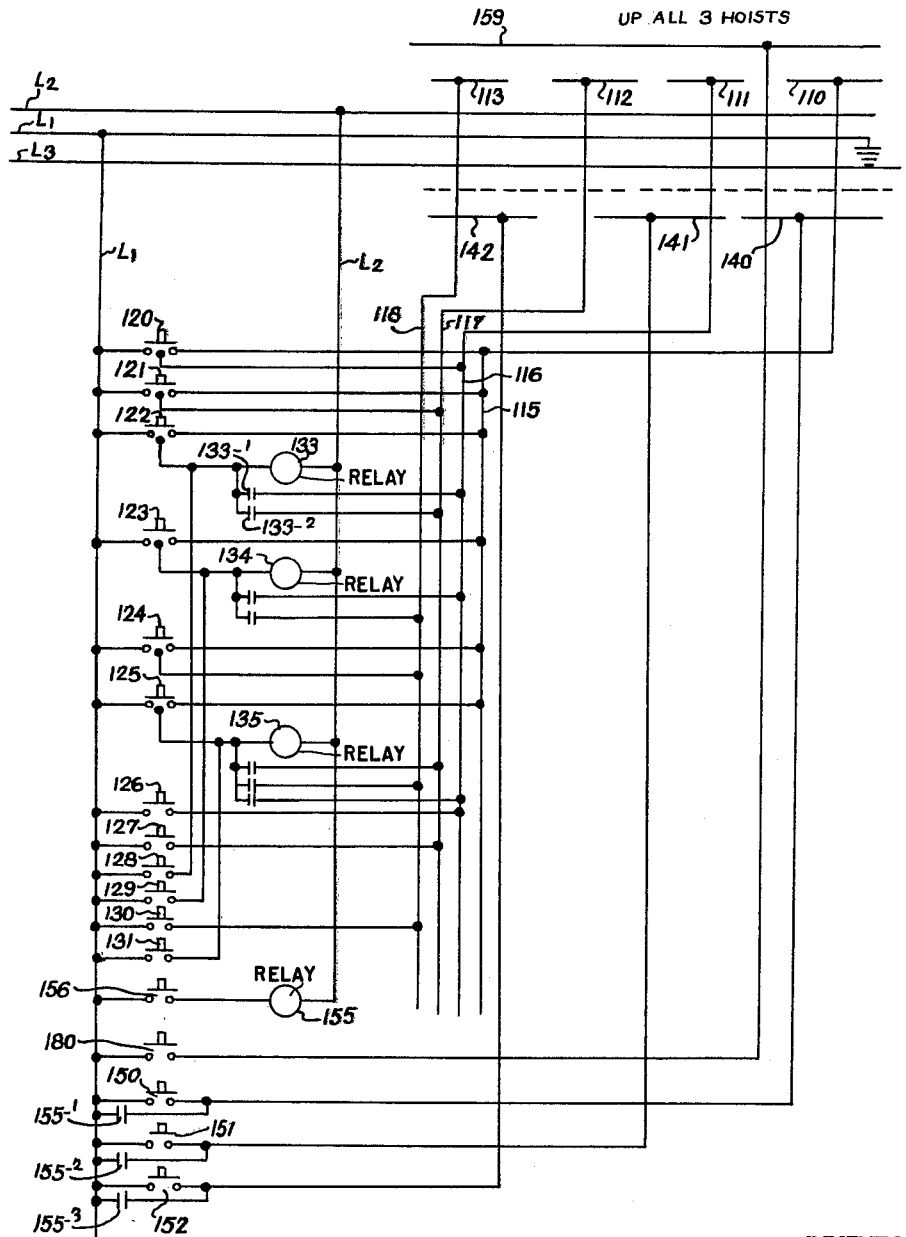
FIG. 4 is an electrical diagram of a control circuit at the loading station for the carrier trains.

The controls at the loading station are shown schematically in FIG. 4 and, as shown therein, an outrig segment or shoe is provided for each of the control collectors 103, 104, 105 and the control collector 88. The outrig segments have been designated by the reference numerals 110, 111, 112 and 113, respectively, and correspond respectively to the collectors 88, 105, 104, 103, respectively, for energizing coils 85L, 100L, 101L, 102L. It will be recalled that the operator energizes the relay coils associated with the control collectors 88, 103, 104, 105 by applying L1 potential to the collectors. The shoes 110 . . . 113 are each adapted to be connected to L1 by a plurality of push button switches for completing circuits from L1 to connections 115, 116, 117, 118, connected respectively to the shoes 110 . . . 113. Twelve push button switches 120 . . . 131 are provided and each of the push button switches corresponds to a respective one of the branch tracks. When the push button switch 120 is depressed, L1 is connected to the connections 115 and 116 to energize the latching coils 85L, 100L to select the first branch track. When the push button switch 121 is depressed, L1 is connected to the connections 115 and 117 to energize the latching coils 85L and 101L to select the second branch track. When the push button switch 122 is depressed, L1 is connected to the connection 115 to effect energization of the latching coil 85L and a relay 133 is energized to close its contacts 133-1, 133-2, to connect L1 to the connection 116 and the connection 117 to energize the latching relay coils 100L, 101L. Similarly, the depression of push button switches 123 . . . 131 effect energization of the various combinations of the connections 115, 116, 117, 118 to energize the proper ones of the relay coils 85L, 102L, 101L, 100L to select the branch track which will be thrown as the carrier approaches. The circuits for energizing the segments in their proper combination include relays 134, 135 that operate in a manner similar to relay 133 to energize connections 116, 118 on one hand and the connections 118, 117 on the other hand. When a plurality of these connections are to be connected to L1, the push button which is depressed effects energization of the proper relay, as clearly shown on the circuit diagram and, therefore, it is not believed that it is necessary to describe the rest of the circuit in detail since it would be merely a repetition of the earlier description, but with reference to different switches and relays.

In addition to the destination selecting shoes 110, 111, 112, 113, the loading station includes three longitudinally spaced conductor shoes 140, 141 and 142 which are engaged by carrier mounted control collectors 143, 144, 145, respectively, when the carrier C is stopped at the loading station. The collectors 143, 144, 145 are connected to energize down relays 146, 147 and 148, respectively for effecting operation of the hoist motors of hoists 35, 36, 37, respectively, in a down direction when L1 potential is applied to the collectors. The control panel at the loading station, shown in FIG. 4, includes push button switches 150, 151, 152, which are actuatable to connect L1 to the shoes 140, 141, 142, respectively, and to energize the relays 146, 147, 148, respectively when the carrier is at the loading station so that the hoist may be selectively lowered. Each of the switches 150, 151, 152 has connected in parallel therewith normally open contacts 155-1, 155-2, 155-3 actuated by a relay coil 155. The relay coil 155 is energizable by depressing a push button switch 156 to energize the relay and to close the contacts 155-1, 155-2 and 155-3 to simultaneously operate the hoists in a down direction. The loading station also includes a conductive shoe or segment 159 supported along the rail 34 which is engaged by a control trolley 158 on the carrier when the latter is at the loading station and to which L1 potential can be applied to effect energization of up relays 160, 161, 162 for operating the motors of hoist 35, 36, 37 in the up directions respectively. The circuits for energizing the up relays 160, 161, 162 are connected in parallel with each other and each parallel connection includes the contacts of a limit switch which are opened when the hoist reaches its maximum elevation and which close when the hoist is lowered. The limit switches are not shown on the hoist but are indicated schematically in FIG. 6 and the limit switches actuated by the hoist 35, 36, 37 have been given the reference numerals 165, 166, 167, respectively. The limit switch 165 has contacts 170 in the connection for energizing up relay 160 and back contacts 171. The limit switch 166 has contacts 172 in the circuit for energizing the up relay 161 which are closed when the hoist is lowered and back contacts 173, while the limit switch 167 has contacts 174 in the circuit for energizing the up relay 162 and back contacts 175 which are closed when the hoist is in an up position.

The control panel of FIG. 4 includes an up push button switch 180 which may be depressed to apply L1 to the collector shoe 159 which is engaged by the collector 158 when the carrier is at the loading station to effect energization of the hoist motors 51 to raise the hoists if the latter are not already in their up position where the contacts 170, 172, 174 are opened.

The forward relay 60 is energized to start the carrier moving in a forward direction when any one of the latching relays 100, 101, 102 has been energized and when all of the hoists are raised. The relay 60 is energized from L1 on the carrier by a circuit which includes the back contacts 171, 173, 175 of the up limit switches 165, 166, 167, the normally closed contacts 182 of a collision limit switch 183 and normally open contacts 100-7, 101-7, 102-7 of the latching relays 100 and 101 and 102 which are connected in parallel with each other and in series with the switches 183, 165, 166, 167 and which when closed connect the relay 60 through the aforementioned switches to L1 to energize the latter. It can be seen, therefore, that after all of the hoists have been raised and one of the push buttons 120 . . . 131 operated to select the destination of the carrier, the forward relay 60 will be automatically energized to start the carrier on its way. The forward relay 60 has normally open contacts 60-1 in a circuit for energizing the timer motor 91 from L1. After a predetermined time interval, the timer motor opens contacts 91-1 which connect the latching coils 85L, 100L, 101L and 102L to L2 to effect a de-energization of the latter. The contacts 91-1 of the timer 91 are open for a very short time, in the range of a fraction of a second, and the contacts are therefore closed while the carrier is moving around most of the track layout shown in FIG. 1. The de-energization of the latching coil does not affect the setting of the relay since, as described hereinbefore, the relays are the latching type and the unlatching coils thereof must be energized to change the condition once the relay has been latched in. As the carrier proceeds from the loading station along the line 12, the limit switch 83 thereon will be tripped each time it approaches a track switch and the relay will be stepped to close in sequence the contacts 67 . . . 72. When the contact of the stepping relay, which completes a circuit to energize the control collector 33 is closed, as determined by the combination of destination relays which was actuated at the loading station, L1 potential will be applied to the collector 33 to throw the switch which the carrier is approaching and to cause the carrier to leave the line 12 and enter the corresponding branch track.

When the carrier arrives at the mold station S on the branch track the tripper 107 at the station actuates limit switch 106 to energize unlatch coils 85U, 100U, 101U, 102U, as well as to energize the reset relay coil 66 of the stepping relay. The unlatching of the latched ones of the relay 100, 101, 102 opens the normally open contacts of the relay in the circuit for energizing the forward run relay 60 to stop the forward movement of the carrier.

Each of the mold stations includes segments or shoes 190, 191 supported along the branch line for engaging the control collectors 143, 144, 145 which are energizable to effect a lowering of the hoist. The mold station includes two molds and when the carrier stops at the station, it stops first at the mold A where the control collectors 143, 144, 145 are in engagement with the shoe 190. This shoe may be connected to L1 to effect a lowering of the hoist by depressing a station mounted push button switch 192. If the hoists are to be lowered at mold B, the carrier may be inched to move the carrier forwardly to a position where the control collectors 143, 144, 145 are in engagement with the shoe or segment 191 and the shoe or segment 191 can be connected to L1 to effect a lowering of the hoist by depressing push button switch 193 mounted at the station.

The carrier can be inched forward at each of the mold stations S by depressing a push button switch 195 which applies L1 potential to a conductive segment or shoe 196 which is engaged by a control collector 197 on the carrier when the carrier is at a mold station. The control collector 197 is connected directly to the L1 side of the forward run relay and as long as the L1 potential is applied thereto the carrier will move forward.

In addition to the push button switch 195 for moving the carrier forward, each control panel at the mold stations includes a reverse push button switch 200 which is depressed to apply L1 potential to a conductive segment or shoe 201 at the station, the shoe 201 being engaged by a collector 202 which is connected to the L1 side of the reverse relay 61 and which is energized when an L1 potential is applied to the control collector 202.

After the operator at each mold station has finished with the carrier and desires to return it to the loading station, the operator may raise the hoists by depressing a switch 203 to apply L1 to a shoe 204 extending along the track at the station and engaged by the collector 158 regardless of whether the carrier is at mold A or B. After the raising of the hoists the operator may depress a switch 205 to apply L1 potential to a conductive segment or shoe 206 which is engaged by the control collectors 88, 103, 104, 105 when the carrier is at the mold station. The energization of these collectors will effect a latching in of all the relays 85, 100, 101, 102 and, as above described, will effect energization of the forward relay 60 through the contacts 100-7, 101-7, 102-7, as long as the hoists are in their up position. The carrier will then be returned to the main line through the exit switch 31 and will proceed to the loading station where it will be stopped by a tripper adapted to trip limit switch 106 for unlatching the relays 85, 100, 101, 102 and energizing the reset coil 66 for the stepping relay.

The exit switches 31 are, in the illustrated embodiment, manually operated exit switches and are set by the operator at the mold station prior to the time that he effects the energization of the forward run relay to return the carrier to its home station.

The loading station L is provided with a tripper 107 which corresponds to the previously described trippers 107 for actuating the limit switch 106 on the carrier to reset the relays 85, 100, 101 and 102.

From the following description, it will be appreciated that the relays 100, 101, 102 can be said to constitute bistable two-position, or binary, elements which form a register that determines the number of times which the stepping relay must be pulsed in order to complete a circuit to the collector or trolley 33. The stepping relay and the register, therefore, constitute an electrical counting means which is presettable to determine the number of input pulses which must be received or registered by the counting means to provide one output control signal. In practice, the relays 100, 101, 102 might be considered as having an 0 registered therein when the relays are in the nonactuated position and as having a 1 set therein when the relays are in their actuated position. If, therefore, the carrier is to be switched at a station where the relay 100 must be energized and the others not energized, the number for the station would be 100. If the carrier were to be switched at a station where the relays 100, 102 only must be energized, the number for the switching station would be 101. The numbers for the other switching stations may be similarly derived. Furthermore, the switch actuating dogs or trippers have been utilized as signal means at the various stations and limit switches as signal responsive means on the carrier. It will be understood that various types of signal and signal responsive means, for example, photocells and magnetic elements, may be utilized.

While the present invention has been described in a system where the stations at which the control function is to be performed are switching stations, it will be understood by those skilled in the art that the control signal derived from the counter could be used to perform various functions. For example, in a system where a carrier operates along a single track through a plurality of stations at which it is to be selectively stopped, the counter could be used to count the stop stations as the carrier proceeds through the stations and to stop the carrier at a preselected one of the stations in response to the control signal from the counter. Similarly, the control signal may merely effect a dumping operation or some other operation with respect to the load on the carrier without affecting the movement of the carrier.

The control collectors have been described as engaging outrig segments or shoes mounted along the track. It will be understood that the collectors could ride on a control bus having segments which are insulated from the remainder of the bus and which correspond to the described shoes or outrigged segments.

From the foregoing, it can be seen that the present invention provides a new and improved control system for automatically effecting a control operation affecting the movement of the carrier as it moves along a track, the track having a plurality of control points therealong at which the control operation might be effected and through which the carrier moves when proceeding along the track, the control system being so constructed and arranged that the carrier counts the control points as it passes each control point and is adapted to be preset to perform the control operation after receiving a predetermined number of counts and so that the number of control points may be greater than the counting capacity of the counter in the control system.

While a preferred embodiment of the present invention has been described in considerable detail, further modifications, constructions and arrangements can be made within the ability of those skilled in the art and it is hereby my intention to cover all such modifications, constructions, and arrangements which fall within the scope and spirit of the appended claims.

Having described my invention, I claim:

1. In a material handling system comprising a self-propelled carrier, a track over which said carrier operates, and a plurality of stations along said track with said carrier being movable from a first one of said stations through the other of said stations in sequence, and wherein a control function is to be performed when said carrier arrives at a preselectable one of said stations, a counter on said carrier providing a carrier control signal for effecting said control function upon the registering of a preselectable count therein, said counter having a maximum counting capacity less than the number of said other stations and including adjustable means operable to preselect the count at which said counter is effective to provide said signal, signal means disposed adjacent said track at each of said other stations, signal responsive means on said carrier responsive to each of said signal means as the carrier moves thereby for entering a unit count in said counter, said signal responsive means including control means having a first condition rendering said signal responsive means ineffective and a second condition rendering the latter effective, means for actuating said control means between its said conditions comprising first means for selectively actuating said control means to its said second condition when said carrier is at said first one of said stations, and second means actuated in response to the movement of said carrier from said first one of said stations through a predetermined number of said other stations for actuating said control means to its said second position.

2. In a material handling system as defined in claim 1 wherein said counter is a stepping relay having a plurality of contacts made and broken in sequence upon repeated pulsing of said relay and a register having a plurality of relays having contacts in series with each of the contacts of said stepping relay whereby a circuit to be made through said counter is only made when said contacts are made and a unique combination of relays which are in series with said contacts are closed.

3. In a material handling system comprising a self-propelled carrier, a track over which said carrier operates, and a plurality of stations along said track with said carrier being movable from a first one of said stations through the other of said stations in sequence, and wherein a control function is to be performed when said carrier arrives at a preselectable one of said stations; a counter on said carrier providing a carrier control signal for effecting said control function upon the registering of a preselectable count therein, said counter having a maximum counting capacity less than the number of said other stations and including register means operable to preselect the count at which said counter is effective to provide said signal; first signal means disposed adjacent said track at each of said other stations; signal responsive means on said carrier responsive to each of said first signal means as the carrier moves thereby for entering a unit count in said counter; said signal responsive means including control means having a first condition rendering said signal responsive means ineffective and a second condition rendering the latter effective; means for actuating said control means between its said conditions comprising first means for selectively actuating said control means to its said second condition when said carrier is at said first one of said stations, and second means actuated in response to the movement of said carrier from said first one of said stations through a predetermined number of said other stations for actuating said control means to its said second position; and second signal means disposed along said track between two of said other stations for actuating said second means as the carrier moves thereby.

4. In a material handling system as defined in claim 3 wherein said counter is a stepping relay having a plurality of contacts made and broken in sequence upon repeated pulsing of said relay and said register comprises a plurality of relays having contacts in series with the contacts of said stepping relay whereby a circuit to be made through each of the respective contacts is made for only a unique combination of actuated ones of said relays.

5. In a material handling system comprising a self-propelled carrier, a tack over which said carrier operates and a plurality of stations along said track with said carrier being movable from a first one of said stations through the other of said stations in sequence, and wherein a control function is to be performed when said carrier arrives at a preselectable one of said stations, first signal means disposed adjacent said track at each of said other stations, a counter on said carrier and providing a control signal for effecting said control function upon registration of a predetermined count, said counter including a binary register for registering a number determinative of the count at which said counter provides said signal, said register comprising at least one bistable two-position element, a conductor on said carrier for each element and connected to the element to actuate the element to a particular state upon energization of the conductor, means mounted at said first one of said stations for selectively energizing said conductor for each element when said carrier is at the station to register a number in said register, and signal responsive means on said carrier responsive to each of said first signal means as the carrier moves thereby for entering a unit count in said counter.

6. In a material handling system, the structure as defined in claim 5 wherein said conductor comprises a current collector and said means mounted at said first one of said stations comprises a conductive member supported alongside said track at said first one of said stations which is engaged by said collector when said carrier is at said station and control means at said station selectively operable to energize said member.

7. In a material handling system as defined in claim 5 wherein said counter is a stepping relay having a plurality of contacts made and broken in sequence upon repeated pulsing of said relay and said register comprises a plurality of relays having contacts in series with the contacts of said stepping relay whereby a circuit to be made through each of the respective contacts is made for only a unique combination of actuated ones of said relays.

8. In a material handling system, the structure as defined in claim 7 wherein said conductor comprises a current collector and said means mounted at said first one of said stations comprises a conductive member supported alongside said track at said first one of said stations which is engaged by said collector when said carrier is at said station and control means at said station selectively operable to energize said member.

9. In a material handling system comprising a self-propelled carrier, a track over which said carrier operates and a plurality of stations along said track with said carrier being movable from a first one of said stations through the other of said stations in sequence, and wherein a control function is to be performed when said carrier arrives at a preselectable one of said stations, first signal means disposed adjacent said track at each of said other stations, a counter on said carrier and providing a control signal for effecting said control function upon registration of a predetermined count, said counter including a binary register for registering a number determinative of the count at which said counter provides said signal, said register comprising at least one bistable binary element, a conductor on said carrier for each element and connected to the element to actuate the element to a particular state upon energization of the conductor, means mounted at said first one of said stations for selectively energizing said conductor for each element when said carrier is at the first one of said stations to register a number in said register, and signal responsive means on said carrier responsive to each of said first signal means as the carrier moves thereby for entering a unit count in said counter, said signal responsive means including control means having a first condition rendering said signal responsive means ineffective and a second condition rendering the latter effective, and means for actuating said control means from its first to its second condition comprising first means for selectively actuating said control means to its said second condition when said carrier is at said first one of said stations and second means actuated in response to the movement of said carrier from said first one of said stations through a predetermined number of said other stations for actuating said control means to its said second position.

10. In a material handling system, the structure as defined in claim 9 wherein said conductor comprises a current collector and said means mounted at said first one of said stations comprises a conductive member supported alongside said track at said first one of said stations which is engaged by said collector when said carrier is at said station and control means at said station selectively operable to energize said member.

11. In a material handling system as defined in claim 9 wherein said counter is a stepping relay having a plurality of contacts made and broken in sequence upon repeated pulsing of said relay and said register comprises a plurality of relays having contacts in series with the contacts of said stepping relay whereby a circuit to be made through each of the respective contacts is made for only a unique combination of actuated ones of said relays.

12. In a material handling system, the structure as defined in claim 11 wherein said conductor comprises a current collector and said means mounted at said first one of said stations comprises a conductive member supported alongside said track at said first one of said stations which is engaged by said collector when said carrier is at said station and control means at said station selectively operable to energize said member.

13. In a material handling system comprising a self-propelled carrier, a track over which said carrier operates and a plurality of stations along said track with said carrier being movable from a first one of said stations through the other of said stations in sequence, and wherein a control function is to be performed when said carrier arrives at a preselectable one of said stations, first signal means disposed adjacent said track at each of said other stations, a counter on said carrier and providing a control signal for effecting said control function upon registration of a predetermined count, said counter including a binary register for registering a number determinative of the count at which said counter provides said signal, said register comprising at least one bistable binary element, a conductor on said carrier for each element and connected to the element to actuate the element to a particular state upon energization of the conductor, means mounted at the said first one of said stations for selectively energizing said conductor for each element when said carrier is at the station to register a number in said register, signal responsive means on said carrier responsive to each of said first signal means as the carrier moves thereby for entering a unit count in said counter, said signal responsive means including control means having a first condition rendering said signal responsive means ineffective and a second condition rendering the latter effective, means for actuating said control means from its first to its second condition comprising first means for selectively actuating said control means to its said second condition when said carrier is at said first one of said stations and second means actuated in response to the movement of said carrier from said first one of said stations through a predetermined number of said other stations for actuating said control means to its said second condition, and second signal means disposed along said track between two of said other stations for actuating said second means.

14. In a material handling system, a self-propelled carrier, a main track over which said carrier operates, a plurality of branch tracks, a plurality of switching stations along said main track for switching said carrier from the main track to respective ones of said branch tracks, signal responsive means at said station for effecting the switching of a carrier in response to a control signal, a stop station along each of said branch tracks, a dispatch station along said track from which said carrier moves in sequence through said switching stations, a control system on said carrier including means providing a signal adapted to actuate each of said signal responsive means when said carrier is adjacent the signal responsive means and a register for registering a number determinative of the one of said signal responsive means which is to be operated, said register including means for setting said register to a preselected number, and reset means for returning said register to zero, second signal means supported along said track at each of said stop stations, means on said carrier responsive to said second signal means for operating said reset means to return the register to zero, and me responsive to a registering of a number in said register for starting the movement of said carrier and responsive to the return of the register to zero for stopping said carrier.

15. In a material handling system, a self-propelled carrier, a main track over which said carrier operates, a plurality of branch tracks, a plurality of switching stations along said main track for switching said carrier from the main track to respective ones of said branch tracks, signal responsive means at said station for effecting the switching of a carrier in response to a control signal, a stop station along each of said branch tracks, a dispatch station along said track from which said carrier moves in sequence through said switching stations, a control system on said carrier including means providing a signal adapted to actuate each of said signal responsive means when said carrier is adjacent the signal responsive means and a register for registering a number determinative of the one of said signal responsive means which is to be operated, said register including means for setting said register to a preselected number, and reset means for returning said register to zero, second signal means supported along said track at each of said stop stations, means on said carrier responsive to said second signal means for operating said reset means to return the register to zero, means responsive to a registering of a number in said register for starting the movement of said carrier and responsive to the return of the register to zero for stopping said carrier, said means providing a control signal comprising a counter which provides said control signal when a count is registered therein corresponding to the number set in said register, signal means adjacent each of said stations, second signal responsive means on said carrier responsive to each of said signal means for entering a unit count in said counter including control means having first and second conditions for rendering said second signal responsive means effective and ineffective, first means selectively operable when said carrier is at said dispatch station to actuate said control means to its said first condition, second signal means supported along said track intermediate two of said switching stations, and means on said carrier connected to said control means and responsive to said second signal means when said carrier passes thereby for actuating said control means to its said first condition.

References Cited in the file of this patent
UNITED STATES PATENTS
2,714,355    Benson ------------------ Aug. 2, 1955